United States Patent
Jain et al.

(10) Patent No.: US 12,235,920 B1
(45) Date of Patent: Feb. 25, 2025

(54) PREVENTING DOUBLE ACTIONS IN A SINGLE-CLICK ENVIRONMENT

(71) Applicant: Capital One Services, LLC, McLean, VA (US)

(72) Inventors: Parag Jain, Falls Church, VA (US); Michael Pruitt, Henrico, VA (US); Benjamin Lee Wolferman, Oakton, VA (US); Mohideen Peer, Union City, CA (US); Paul Bradley Robb, Cartersville, VA (US); Kevin Yafuso, Sterling, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/489,554

(22) Filed: Oct. 18, 2023

(51) Int. Cl.
  *G06F 16/954* (2019.01)
  *G06F 16/955* (2019.01)

(52) U.S. Cl.
  CPC ........ *G06F 16/954* (2019.01); *G06F 16/9566* (2019.01)

(58) Field of Classification Search
  None
  See application file for complete search history.

(56) References Cited

U.S. PATENT DOCUMENTS

| | | |
|---|---|---|
| 5,960,411 A | 9/1999 | Hartman et al. |
| 8,230,343 B2 * | 7/2012 | Logan ................ H04N 21/8547 725/39 |
| 11,270,314 B2 | 3/2022 | Gerling-Ospina et al. |
| 2009/0106413 A1 * | 4/2009 | Salo ...................... G06Q 30/02 709/224 |
| 2011/0264673 A1 * | 10/2011 | White ................. G06F 16/9538 707/750 |
| 2016/0004820 A1 * | 1/2016 | Moore ................... G16H 15/00 705/3 |
| 2018/0173744 A1 * | 6/2018 | Barbas ................ G06F 16/2365 |
| 2019/0370404 A1 | 12/2019 | Kessee et al. |
| 2020/0278843 A1 * | 9/2020 | Olivier .................... G06F 9/542 |

OTHER PUBLICATIONS

Demetris Antoniades, et al., "One-Click Hosting Services: A File-Sharing Hideout," ICM '09 (2009), 12 pages.

* cited by examiner

*Primary Examiner* — Fadi Haj Said
(74) *Attorney, Agent, or Firm* — Harrity & Harrity, LLP

(57) ABSTRACT

In some implementations, a web instance may receive an indication of an event associated with a uniform resource locator (URL) that includes a slug. The web instance may determine, using an indicator encoded in the slug, that the URL is associated with an action that is included in a concurrency control group. The web instance may communicate with a remote database to determine whether the concurrency control group is locked. The web instance may selectively trigger execution of the action based on whether the concurrency control group is locked.

18 Claims, 10 Drawing Sheets

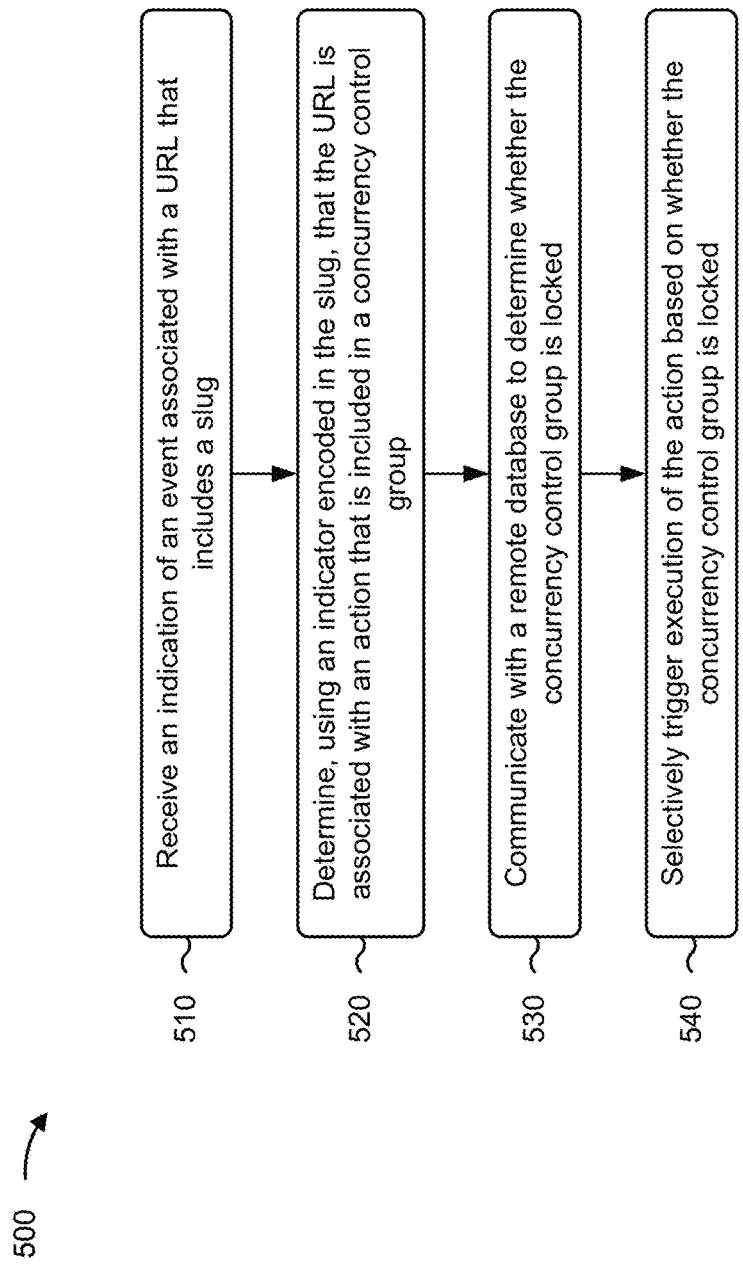

PREVENTING DOUBLE ACTIONS IN A SINGLE-CLICK ENVIRONMENT

BACKGROUND

In order to perform an action associated with an account, a user device may provide a set of credentials associated with a user that owns (or at least controls) the account. In order to expedite the action, the user device may transmit a request using a single-click uniform resource locator (URL). Therefore, a remote system may perform the action without having to receive the set of credentials.

SUMMARY

Some implementations described herein relate to a system for preventing double actions in a single-click environment. The system may include one or more memories and one or more processors communicatively coupled to the one or more memories. The one or more processors may be configured to receive an indication of a click event associated with a URL that includes a slug. The one or more processors may be configured to determine, using a bit included in the slug, that the URL is associated with an action that is controlled for concurrency. The one or more processors may be configured to communicate with a remote database to determine whether the action is currently locked. The one or more processors may be configured to selectively trigger execution of the action based on whether the action is currently locked.

Some implementations described herein relate to a method of preventing double actions in a single-click environment. The method may include receiving, at a web instance, an indication of an event associated with a URL that includes a slug. The method may include determining, by the web instance and using an indicator encoded in the slug, that the URL is associated with an action that is included in a concurrency control group. The method may include communicating with a remote database to determine whether the concurrency control group is locked. The method may include selectively triggering, by the web instance, execution of the action based on whether the concurrency control group is locked.

Some implementations described herein relate to a non-transitory computer-readable medium that stores a set of instructions for preventing double actions in a single-click environment. The set of instructions, when executed by one or more processors of a device, may cause the device to transmit, to a remote device, an indication of a first click event associated with a first URL. The set of instructions, when executed by one or more processors of the device, may cause the device to receive, from the remote device, a response associated with the first click event. The set of instructions, when executed by one or more processors of the device, may cause the device to transmit, to the remote device, an indication of a second click event associated with a second URL. The set of instructions, when executed by one or more processors of the device, may cause the device to receive, from the remote device, an error message, associated with the second click event, based on the second URL being related to the first URL.

BRIEF DESCRIPTION OF THE DRAWINGS

FIG. 5 is a flowchart of an example process relating to preventing double actions in a single-click environment, in accordance with some embodiments of the present disclosure.

DETAILED DESCRIPTION

Figure 1A:
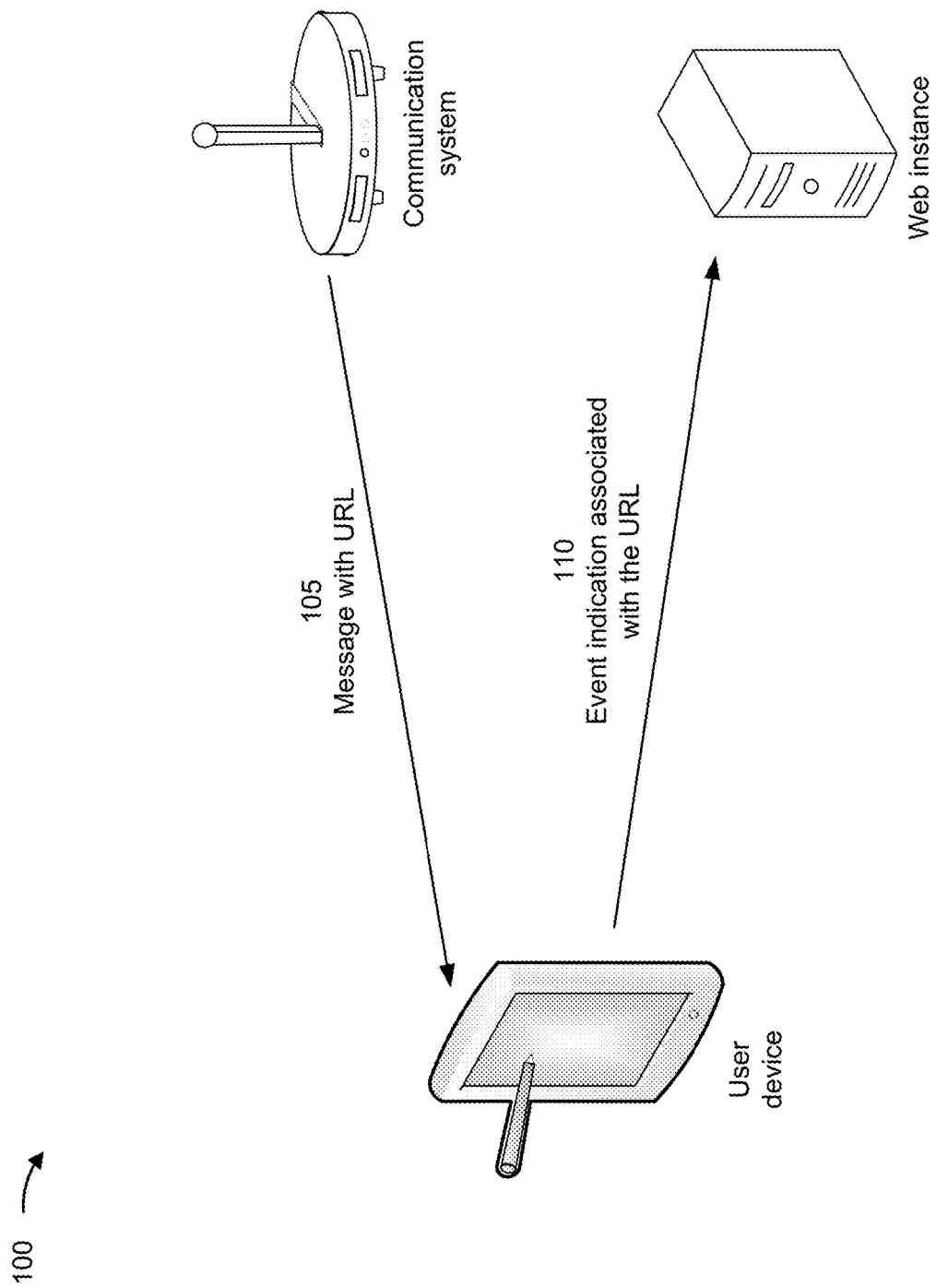
FIGS. 1A-1F are diagrams of an example implementation relating to preventing double actions in a single-click environment, in accordance with some embodiments of the present disclosure.

The following detailed description of example implementations refers to the accompanying drawings. The same reference numbers in different drawings may identify the same or similar elements.

Generally, in order to perform an action associated with an account, a user device may provide a set of credentials associated with a user that owns (or at least controls) the account. Accordingly, a web host (or another type of remote device) may validate the set of credentials, and the user device may request the web host to perform the action after the set of credentials are validated. This process increases network overhead and consumes time, power, and computing resources. In order to expedite the action and conserve computing resources, the user device may transmit a request using a single-click uniform resource locator (URL). For example, the URL may encode an identifier of the action such that the web host may perform the action without receiving and validating the set of credentials.

However, some actions may include contradictory workflows at the web host. For example, a workflow to register an email address for a newsletter should not be executed concurrently with a workflow to unsubscribe the email address from the newsletter. In another example, a workflow to process a minimum payment for an account should not be executed concurrently with a workflow to process a statement payment for the account. Nonetheless, user and device errors sometimes result in multiple single-click URLs, associated with contradictory workflows, being activated within a short amount of time. For example, a communication, such as an email message or a text message, may include a plurality of single-click URLs, such that the user (and/or the user device) transmits a plurality of requests, associated with the plurality of single-click URLs, within a short amount of time. As a result, the web host may waste power and processing resources on contradictory workflows or may even fail to correctly perform actions due to an error in trying to process the contradictory workflows.

Some implementations described herein enable a slug encoded in a URL to indicate whether an action associated with the URL is controlled for concurrency. As a result, the action is not processed, based on a concurrent action already being executed, which conserves power and processing resources and ensures that the concurrent action is correctly performed by preventing an error that would otherwise be caused by a contradictory action. In a distributed single-click environment, different web instances may process actions. Therefore, the web instances may use distributed locking at a remote database to control for concurrency based on URL slugs.

FIGS. 1A-1F are diagrams of an example 100 associated with preventing double actions in a single-click environment. As shown in FIGS. 1A-1F, example 100 includes a user device, a communication system, a web instance, a remote database, and a web host. These devices are described in more detail in connection with FIGS. 3 and 4.

As shown in FIG. 1A and by reference number 105, the communication system may transmit, and the user device may receive, a message including a URL. For example, the message may include an email message, a text message, and/or another type of electronic message. The URL may be included visibly (e.g., in text that is output to a user of the user device, optionally with hyperlink formatting, such as a blue font and/or underlining) or may be included invisibly (e.g., in a button and/or another type of user interface (UI) element that links to the URL when interacted with).

As shown by reference number 110, the user device may transmit, and the web instance may receive, an indication of an event associated with the URL. For example, the event may include a click event (e.g., caused by the user of the user device clicking or tapping on the URL, or on a UI element associated with the URL, via an input component of the user device). Accordingly, the user device may transmit a request (e.g., a hypertext transfer protocol (HTTP) request) using the URL, and the request may indicate the event.

Figure 1B:
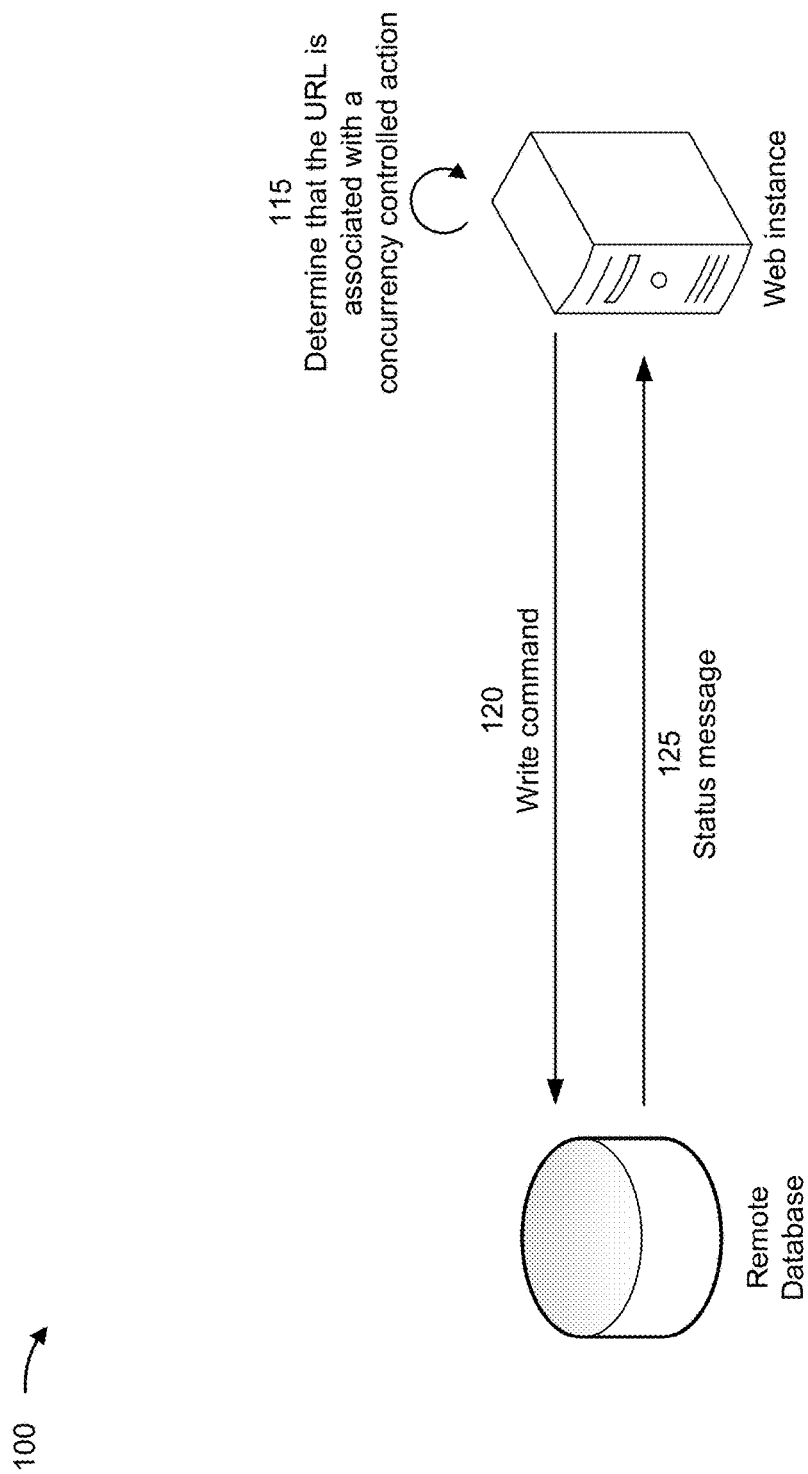

As shown in FIG. 1B and by reference number 115, the web instance may determine that the URL is associated with an action that is controlled for concurrency. For example, the URL may be associated with a binary concurrency indication (e.g., a Boolean set to '1' or 'TRUE' to indicate that the action is controlled for concurrency). Additionally, or alternatively, the URL may be associated with a concurrency control group, where a concurrency control group includes a set of actions that are associated with contradictory workflows.

In some implementations, the URL may include an indicator of concurrency control. The indicator may include a character (e.g., at least one character) in the URL. For example, the indicator may encode an identifier of a concurrency control group out of a plurality of possible concurrency control groups. Additionally, or alternatively, as described in connection with FIG. 2, the indicator may include a bit (e.g., at least one bit) in the URL. For example, the indicator may encode a Boolean or another type of binary indicator of concurrency control. Therefore, the web instance may perform the determination based on the indicator in the URL.

In some implementations, the URL may include a slug such that the indicator is included in the slug. As used herein, "slug" may refer to a unique identifier (of a page or action) included in the URL, where the slug is unique relative to related pages or actions. A slug may be numeric only or may be alphanumeric. A slug may be human-readable (e.g., encoding a title of a page or action through a parameter, such as "?title=EXAMPLE-TITLE") and/or may be machine-readable (e.g., encoding a sequence of characters in the URL, such as "/j3i5nbiserk"). In some implementations, as described in connection with FIG. 2, the slug may include a first portion associated with a session identifier (ID) and a second portion associated with an identifier of the action (also referred to as an "action ID"). Accordingly, the indicator included in the slug may be in the second portion of the slug. Additionally, or alternatively, the indicator may include a most significant bit (MSB) or a least significant bit (LSB) in a bit sequence that encodes the action ID.

Based on determining that the action is controlled for concurrency, the web instance may communicate with the remote database to determine whether the action (and/or the concurrency control group including the action) is locked. Accordingly, when the action (and/or the concurrency control group including the action) is currently locked, the web instance may refrain from performing the action, which conserves power and processing resources at the web instance. Additionally, the web instance ensures that an ongoing action is correctly performed by preventing an error that would otherwise be caused by performing the action.

In some implementations, and as shown by reference number 120, the web instance may transmit, and the remote database may receive, a command to perform a write operation. The write operation may be associated with the action (and/or the concurrency control group including the action). For example, the command may be to write a lock key associated with the action (and/or the concurrency control group including the action). In some implementations, the lock key may include the indicator encoded in the URL and may be associated with execution of the action. Therefore, when the action (and/or the concurrency control group including the action) is unlocked, the web instance may write the lock key to prevent performance of another action controlled by concurrency (and/or another action in the same concurrency control group), which conserves power and processing resources at the web instance. Additionally, the web instance ensures that an ongoing action is correctly performed by preventing an error that would otherwise be caused by performing the action.

As shown by reference number 125, the remote database may transmit, and the web instance may receive, a status message in response to the command. For example, the remote database may implement distributed locking such that the command is rejected based on the lock key already being written (e.g., indicating that another concurrency controlled action or another action in the concurrency control group is already being executed). Therefore, the action (and/or the concurrency control group including the action) may be determined to be locked based on the status message indicating that the command failed. On the other hand, the action (and/or the concurrency control group including the action) may be determined to be unlocked based on the status message indicating that the command was successful. The remote database thus allows a plurality of web instances to control for concurrency across the plurality of web instances.

In some implementations, the lock key may be written with an expiry time (e.g., an amount of time after which the remote database should remove the lock key and/or a particular datetime at which the remote database should remove the lock key). Therefore, the action (and/or the concurrency control group including the action) is not locked indefinitely but only for an amount of time that approximates an amount of time used to perform a workflow associated with the action (optionally with some extra time to control for latency). Additionally, or alternatively, the web instance may transmit a command to delete the lock key in response to performing the action (e.g., as described in connection with FIG. 1D).

Figure 1C:
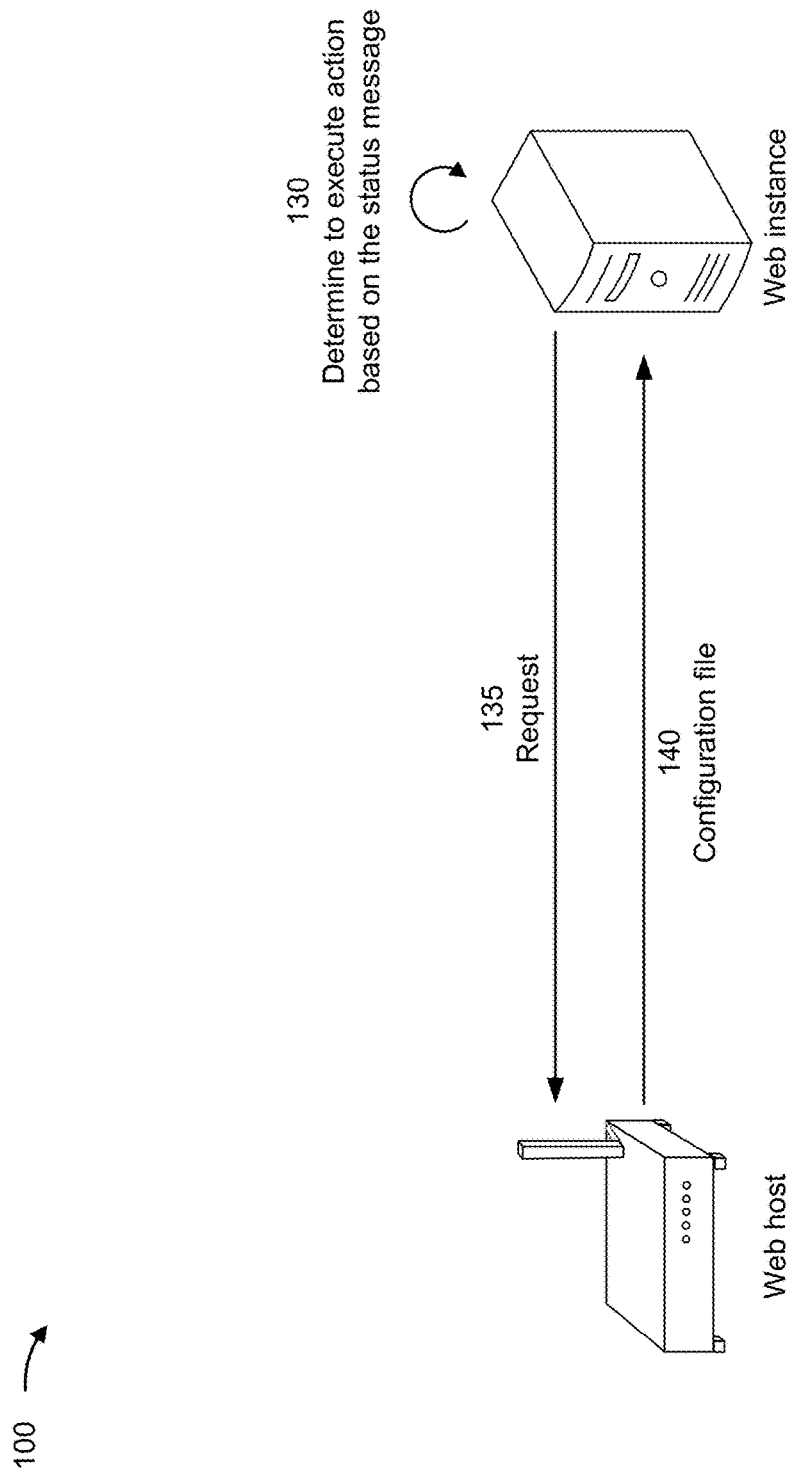

Based on the status message from the remote database, and as shown in FIG. 1C and by reference number 130, the web instance may determine to execute the action. For example, the web instance may determine to execute the action based on determining that the action (and/or the concurrency control group including the action) is unlocked, as described above. Therefore, the web instance may selectively trigger execution of the action based on whether the action (and/or the concurrency control group including the action) is (currently) locked. Selective execution may include execution of the action when the action (and/or the concurrency control group including the action) is (currently) unlocked and restraint from execution of the action when the action (and/or the concurrency control group including the action) is (currently) locked.

As shown by reference number 135, the web instance may transmit, and the web host may receive, a request for a configuration file associated with the action. For example, the configuration file may include a JavaScript® object notation (JSON) file that indicates the action, indicates whether the action is controlled for concurrency (and/or indicates a concurrency control group including the action), and indicates code for performing the action. The configuration file may indicate the code directly or may link to an additional file (e.g., a Python file) with the code. The request may include an HTTP request, a file transfer protocol (FTP) request, and/or another type of request message. The web instance may indicate the action in the request (e.g., using a name of the action, an action ID for the action, and/or another alphanumeric identifier associated with the action).

As shown by reference number 140, the web host may transmit, and the web instance may receive, the configuration file. Therefore, the web instance may selectively transmit the request for the configuration file, and may selectively receive the configuration file, based on whether the action (and/or the concurrency control group including the action) is (currently) locked. As a result, the web instance conserves power and processing resources (at both the web instance and the web host) and reduces network overhead as compared with requesting (and receiving) the configuration file for an action that is locked (and/or is included in a concurrency control group that is locked). Selective request and reception may include requesting and receiving the configuration file when the action (and/or the concurrency control group including the action) is (currently) unlocked and restraint from requesting and receiving the configuration file when the action (and/or the concurrency control group including the action) is (currently) locked.

In some implementations, the web instance may use the configuration file to verify whether the action is controlled for concurrency. For example, the configuration file may include a concurrency_controlled_group variable associated with the action that includes a Boolean indicator (or another type of binary indicator) of concurrency control and/or that includes a numeric, hexadecimal, or alphanumeric indicator of a concurrency control group including the action. Therefore, if the web instance incorrectly determined that the action was not controlled for concurrency, the web instance may communicate with the remote database in response to determining that the action is controlled for concurrency based on the configuration file associated with the action.

Figure 1D:
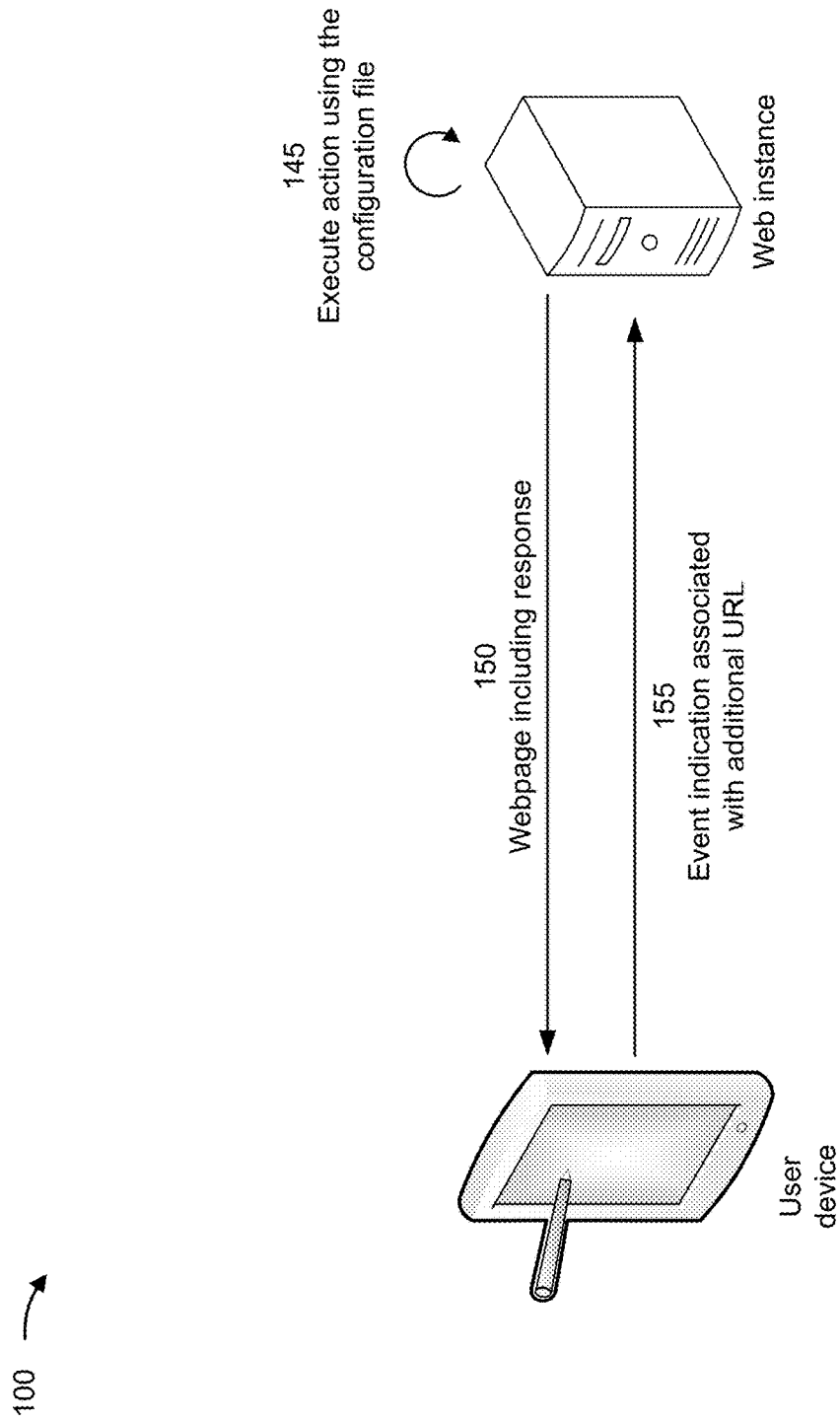

As shown in FIG. 1D and by reference number 145, the web instance may execute the action using the configuration file. For example, the web instance may selectively trigger execution of the action, using the configuration file, based on whether the action (and/or the concurrency control group including the action) is (currently) locked. In some implementations, the web instance may execute code included in (or at least indicated by) the configuration file to perform the action.

In some implementations, the web instance may transmit, and the user device may receive, a response associated with the event. As shown by reference number 150, the web instance may transmit, and the user device may receive, a webpage including the response. The webpage may include a hypertext markup language (HTML) file, a cascading style sheet (CSS), and/or supporting media (e.g., an image file, an audio file, and/or a video file, among other examples). Accordingly, the user device may output (e.g., using a web browser executed by the user device) the webpage including the response.

In some implementations, the message described in connection with reference number 105 may include a plurality of URLs. Therefore, the user may click or tap on an additional URL, or on a UI element associated with the additional URL, via an input component of the user device. Additionally, or alternatively, the user device may transmit a request (e.g., an HTTP request) using an additional URL. Accordingly, as shown by reference number 155, the user device may transmit, and the web instance may receive, an additional indication of an additional event associated with an additional URL.

Figure 1E:
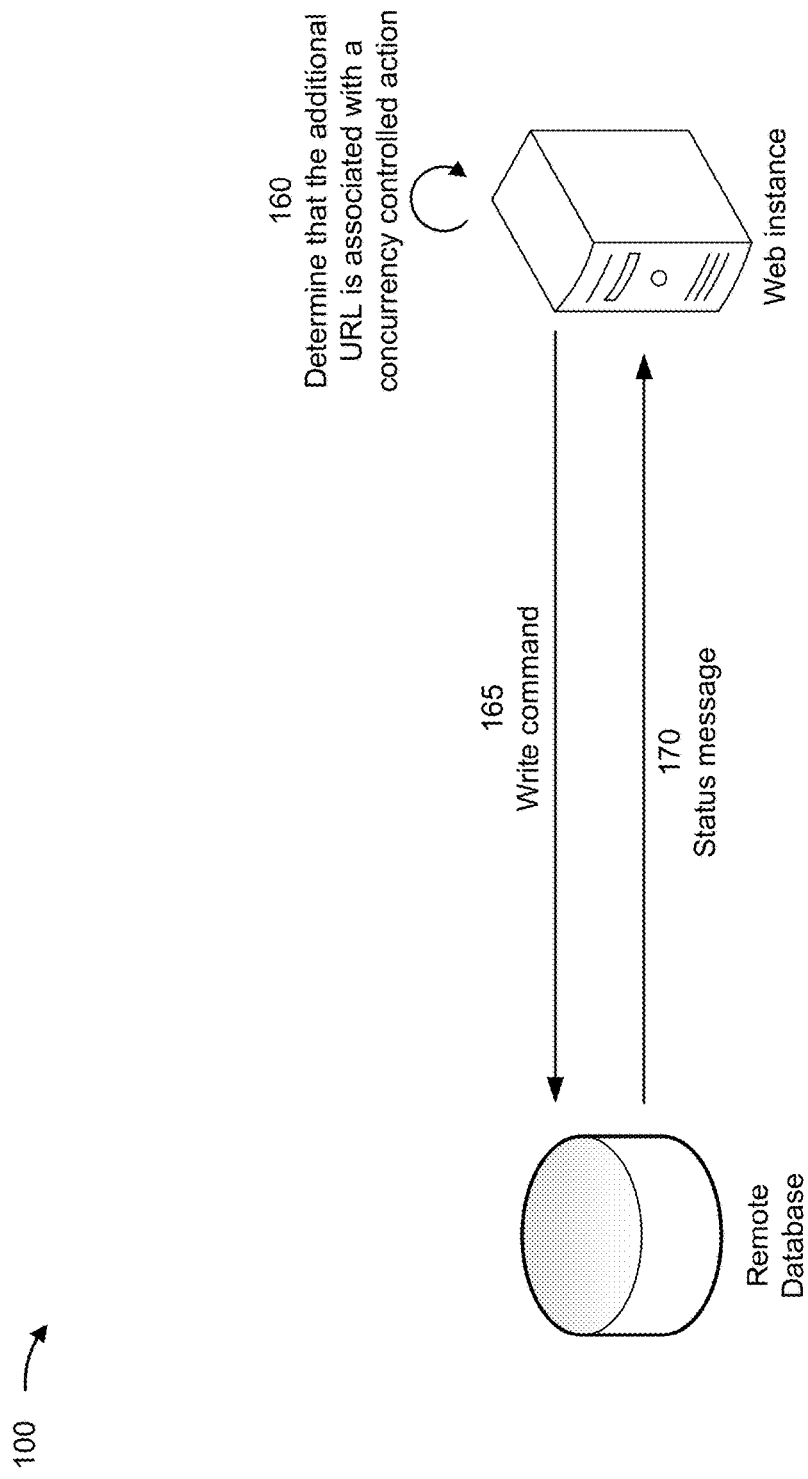

As shown in FIG. 1E and by reference number 160, the web instance may determine that the additional URL is associated with an additional action that is controlled for concurrency. For example, the additional URL may be associated with a binary concurrency indication (e.g., a Boolean set to '1' or 'TRUE' to indicate that the additional action is controlled for concurrency). Additionally, or alternatively, the additional URL may be associated with the concurrency control group that includes the URL. The web instance may perform the determination for the additional URL similarly as described in connection with reference number 115 for the URL.

Based on determining that the action is controlled for concurrency, the web instance may communicate with the remote database to determine whether the additional action (and/or the concurrency control group including the additional action) is locked. Accordingly, when the additional action (and/or the concurrency control group including the additional action) is currently locked, the web instance may refrain from performing the additional action, which conserves power and processing resources at the web instance. Additionally, the web instance ensures that the action currently being performed (e.g., as described in connection with reference number 145) is correctly performed by preventing an error that would otherwise be caused by performing the additional action.

In some implementations, and as shown by reference number 165, the web instance may transmit, and the remote database may receive, a command to perform a write operation. For example, as described in connection with reference number 120, the command may be to write a lock key associated with the additional action (and/or the concurrency control group including the additional action).

As shown by reference number 170, the remote database may transmit, and the web instance may receive, a status message in response to the command. Therefore, as described above in connection with reference number 125, the additional action (and/or the concurrency control group including the additional action) may be determined to be locked based on the status message indicating that the command failed. On the other hand, the additional action (and/or the concurrency control group including the additional action) may be determined to be unlocked based on the status message indicating that the command was successful.

Figure 1F:
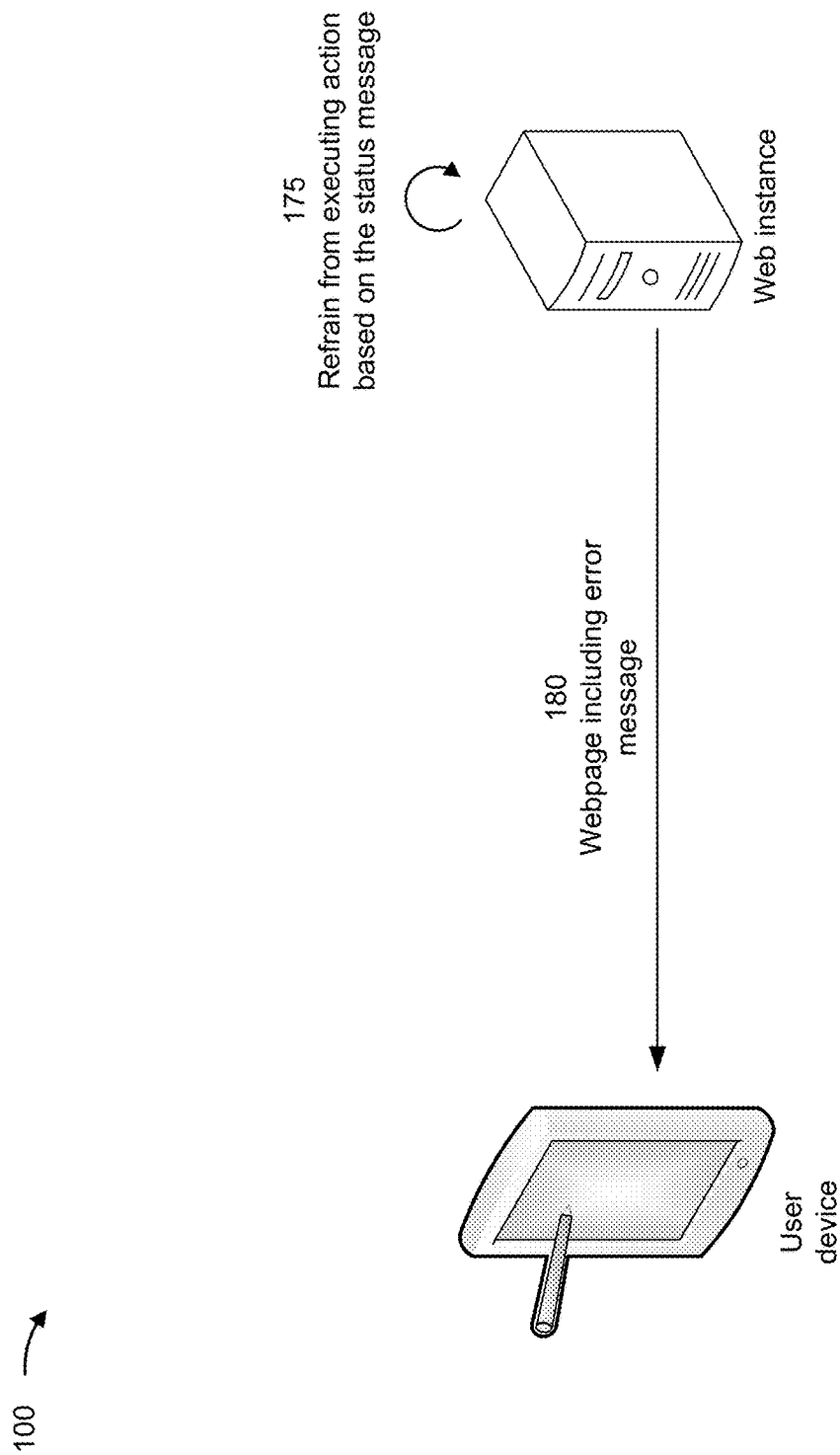

Based on the status message from the remote database, and as shown in FIG. 1F and by reference number 175, the web instance may determine to refrain from executing the additional action. For example, the web instance may determine to refrain from executing the additional action based on determining that the additional action (and/or the concurrency control group including the additional action) is locked, as described above. Therefore, the web instance may selectively trigger execution of the additional action based on whether the additional action (and/or the concurrency control group including the additional action) is (currently) locked.

In some implementations, the web instance may transmit, and the user device may receive, an error message with the additional event. As shown by reference number 180, the web instance may transmit, and the user device may receive, a webpage including the error message. The webpage may include an HTML file, a CSS, and/or supporting media (e.g., an image file, an audio file, and/or a video file, among other examples). Accordingly, the user device may output (e.g., using a web browser executed by the user device) the webpage including the error message.

Although the example 100 is described in connection with a same web instance processing the request based on the URL and the request based on the additional URL, other examples may include different web instances processing different requests. Because the remote database implements distributed locking, the action and the additional action are still controlled for concurrency across the different web instances. The web instances may be in a distributed environment (e.g., hosted by an instance engine, as described in connection with FIG. 3, that is distributed across a plurality of servers, server racks, and/or data centers).

Additionally, or alternatively, although the example 100 is described in connection with the additional URL, in other examples, the user may click or tap on the URL, or on the UI element associated with the additional URL, a second time (e.g., by mistake). Additionally, or alternatively, the user device may transmit an additional request (e.g., an HTTP request) using the URL (e.g., in error or in response to an inadvertent second interaction from the user). Accordingly, operations described in connection with FIGS. 1E and 1F may be associated with the same URL (and thus the same action) as operations described in connection with FIGS. 1B and 1C.

By using techniques as described in connection with FIGS. 1A-1F, information encoded in a first URL and a second URL (whether different URLs or a same URL) indicate whether actions associated with the URLs are controlled for concurrency. Therefore, the web instance may refrain from performing an action associated with the second URL based on an action associated with the first URL already being executed. As a result, the web instance conserves power and processing resources and ensures that the action associated with the first URL is correctly performed by preventing an error that would otherwise be caused by the action associated with the second URL.

As indicated above, FIGS. 1A-1F are provided as an example. Other examples may differ from what is described with regard to FIGS. 1A-1F.

Figure 2:
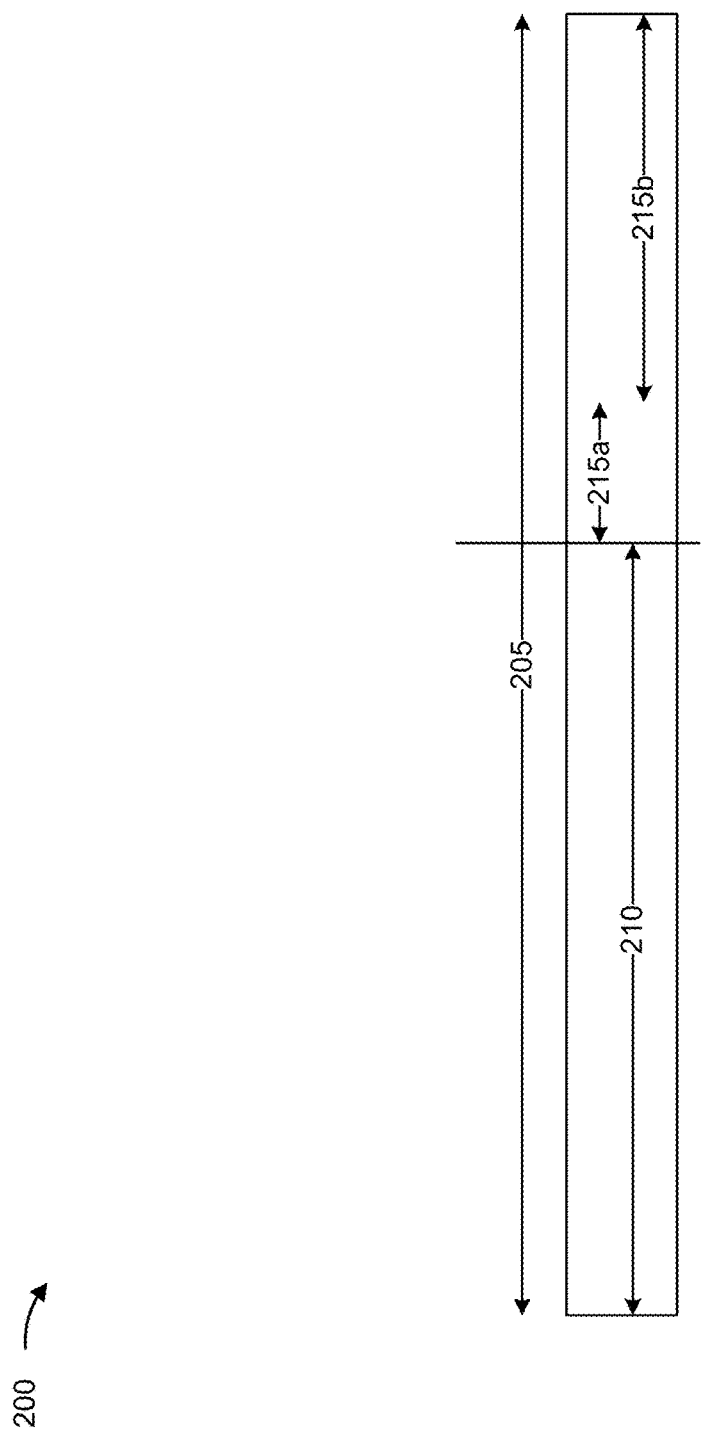
FIG. 2 is a diagram of an example slug format for uniform resource locators, in accordance with some embodiments of the present disclosure.

FIG. 2 is a diagram of an example slug format 200 for URLs. The example slug format 200 may be used for a URL that is provided to a user device (e.g., by a communication system) and decoded at a web instance. These devices are described in more detail in connection with FIGS. 3 and 4.

As shown in FIG. 2, a URL may include a slug 205 that includes a sequence of bits (which are output to a user as a sequence of characters). A first portion 210 of the sequence may encode a session ID. Additionally, a second portion 215 of the sequence may encode an action ID. Therefore, an indicator 215a may be encoded in a first set of bits (or a first set of characters) in the second portion 215. The indicator 215a may indicate whether an action, associated with the action ID, is controlled for concurrency. Additionally, or alternatively, the indicator 215a may indicate which concurrency control group, from a plurality of possible concurrency control groups, includes the action. Therefore, a remainder 215b in the second portion 215 may function to identify the action (e.g., from a plurality of possible actions).

URLs may thus be described as "related" when at least one bit and/or at least one character in the slugs of the URLs are the same. For example, a first URL may be related to a second URL based on a bit (or a character) in a slug of the first URL being the same as a corresponding bit (or a corresponding character) in a slug of the second URL. The bits (or characters) may correspond based on having a same position overall (e.g., the corresponding bits or characters are both tenth in the URLs), a same position in the slugs (e.g., the corresponding bits or characters are both fourth in the slugs), and/or a same position in a portion of the slugs (e.g., the corresponding bits or characters are both first in the action IDs).

As indicated above, FIG. 2 is provided as an example. Other examples may differ from what is described with regard to FIG. 2. For example, some examples may exclude the session ID. Additionally, or alternatively, some examples may include additional IDs in the slug.

Figure 3:
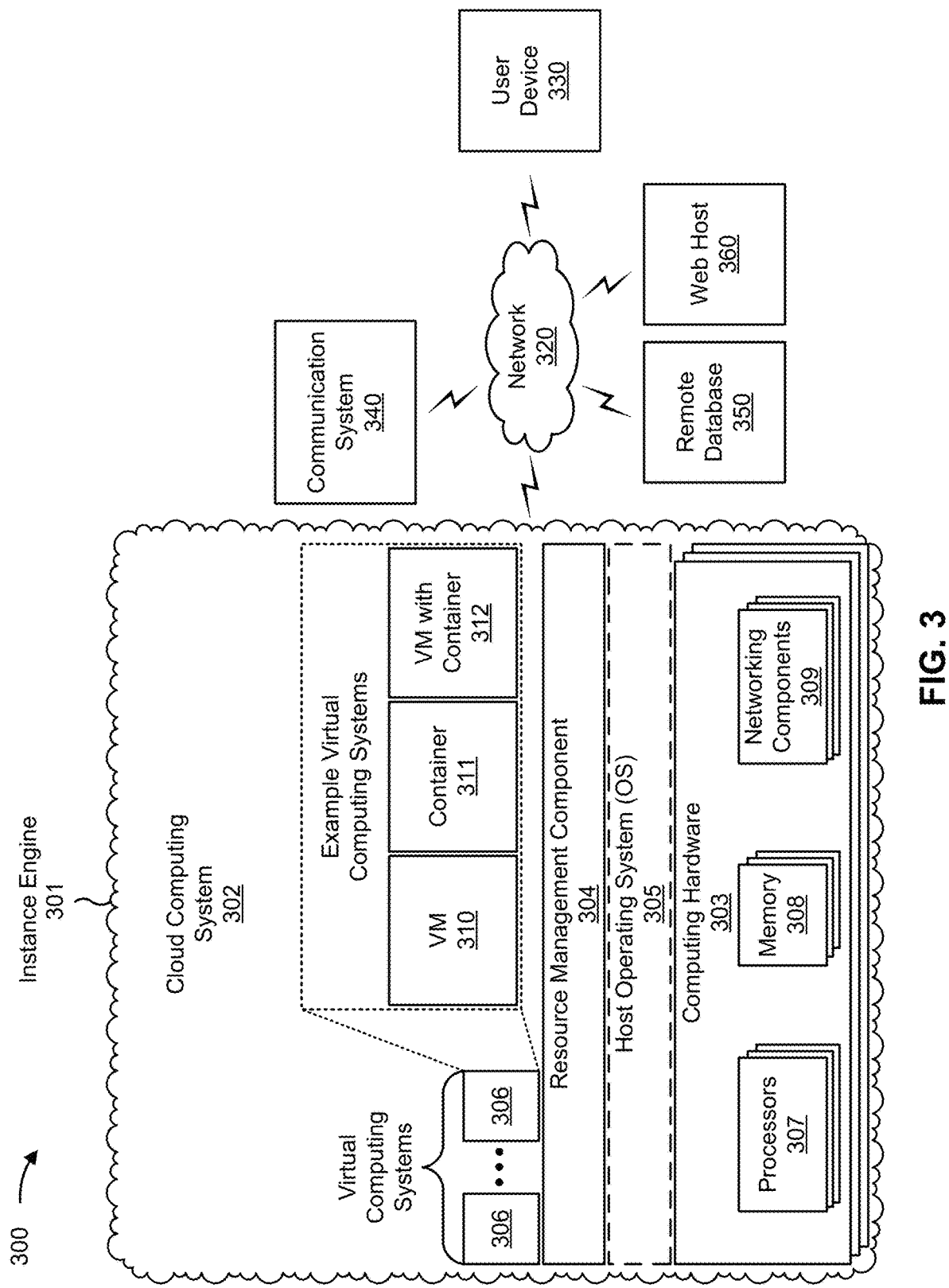
FIG. 3 is a diagram of an example environment in which systems and/or methods described herein may be implemented, in accordance with some embodiments of the present disclosure.

FIG. 3 is a diagram of an example environment 300 in which systems and/or methods described herein may be implemented. As shown in FIG. 3, environment 300 may include an instance engine 301, which may include one or more elements of and/or may execute within a cloud computing system 302. The cloud computing system 302 may include one or more elements 303-312, as described in more detail below. As further shown in FIG. 3, environment 300 may include a network 320, a user device 330, a communication system 340, a remote database 350, and/or a web host 360. Devices and/or elements of environment 300 may interconnect via wired connections and/or wireless connections.

The cloud computing system 302 may include computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

The computing hardware 303 may include hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, and/or one or more networking components 309.

Examples of a processor, a memory, and a networking component (e.g., a communication component) are described elsewhere herein.

The resource management component 304 may include a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 310. Additionally, or alternatively, the resource management component 304 may include a container manager, such as when the virtual computing systems 306 are containers 311. In some implementations, the resource management component 304 executes within and/or in coordination with a host operating system 305.

A virtual computing system 306 may include a virtual environment that enables cloud-based execution of operations and/or processes described herein using computing hardware 303. As shown, a virtual computing system 306 may include a virtual machine 310, a container 311, or a hybrid environment 312 that includes a virtual machine and a container, among other examples. A virtual computing system 306 may execute one or more applications using a file system that includes binary files, software libraries, and/or other resources required to execute applications on a guest operating system (e.g., within the virtual computing system 306) or the host operating system 305.

Although the instance engine 301 may include one or more elements 303-312 of the cloud computing system 302, may execute within the cloud computing system 302, and/or may be hosted within the cloud computing system 302, in some implementations, the instance engine 301 may not be cloud-based (e.g., may be implemented outside of a cloud computing system) or may be partially cloud-based. For example, the instance engine 301 may include one or more devices that are not part of the cloud computing system 302, such as device 400 of FIG. 4, which may include a stand-alone server or another type of computing device. The instance engine 301 may perform one or more operations and/or processes described in more detail elsewhere herein. For example, the instance engine 301 may host one or more web instances that perform one or more operations and/or processes described in more detail elsewhere herein.

The network 320 may include one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The user device 330 may include one or more devices capable of receiving, generating, storing, processing, and/or providing information associated with single-click URLs, as described elsewhere herein. The user device 330 may include a communication device and/or a computing device. For example, the user device 330 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. The user device 330 may communicate with one or more other devices of environment 300, as described elsewhere herein.

The communication system 340 may include one or more devices in one or more wired and/or wireless networks. For example, the communication system 340 may include a base station and/or core network components of a cellular network (e.g., a fifth generation (5G) network, a fourth generation (4G) network, a long-term evolution (LTE) network, a third generation (3G) network, a code division multiple access (CDMA) network, etc.), a PLMN, a LAN, a WAN, a metropolitan area network (MAN), a telephone network (e.g., the Public Switched Telephone Network (PSTN)), a private network, an ad hoc network, an intranet, the Internet, a fiber optic-based network, and/or a combination of these or other types of networks. Additionally, or alternatively, the communication system 340 may include a communication device and/or a computing device, such as a server, a database server, an application server, a client server, a web server, a host server, a proxy server, a virtual server (e.g., executing on computing hardware), a server in a cloud computing system, a device that includes computing hardware used in a cloud computing environment, or a similar type of device. The communication system 340 may communicate with one or more other devices of environment 300, as described elsewhere herein.

The remote database 350 may be implemented using one or more devices capable of receiving, generating, storing, processing, and/or providing information associated with lock keys, as described elsewhere herein. The remote database 350 may be implemented on a communication device and/or a computing device. For example, the remote database 350 may be implemented on a server, a database server, an application server, a client server, a web server, a host server, a proxy server, a virtual server (e.g., executing on computing hardware), a server in a cloud computing system, a device that includes computing hardware used in a cloud computing environment, or a similar type of device. The remote database 350 may communicate with one or more other devices of environment 300, as described elsewhere herein.

The web host 360 may include one or more devices capable of receiving, generating, storing, processing, and/or providing information associated with configuration files, as described elsewhere herein. The web host 360 may include a communication device and/or a computing device. For example, the web host 360 may include a server, a database server, an application server, a client server, a web server, a host server, a proxy server, a virtual server (e.g., executing on computing hardware), a server in a cloud computing system, a device that includes computing hardware used in a cloud computing environment, or a similar type of device. The web host 360 may communicate with one or more other devices of environment 300, as described elsewhere herein.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
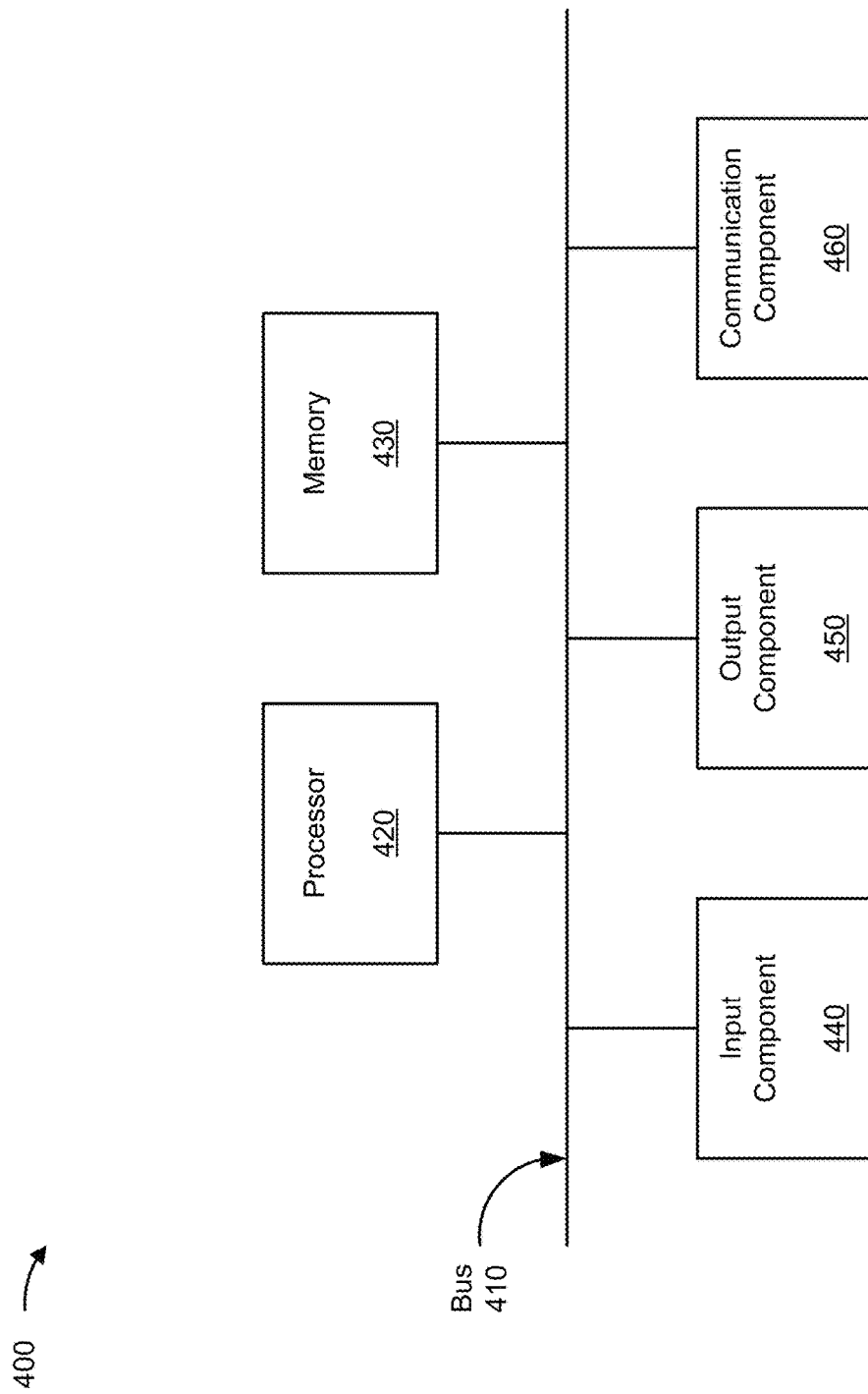
FIG. 4 is a diagram of example components of one or more devices of FIG. 3, in accordance with some embodiments of the present disclosure.

FIG. 4 is a diagram of example components of a device 400 associated with preventing double actions in a single-click environment. The device 400 may correspond to a user device 330, a communication system 340, a device providing a remote database 350, and/or a web host 360. In some implementations, a user device 330, a communication system 340, a device providing a remote database 350, and/or a web host 360 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 is a flowchart of an example process 500 associated with preventing double actions in a single-click environment. In some implementations, one or more process blocks of FIG. 5 may be performed by a web instance hosted by instance engine 301. In some implementations, one or more process blocks of FIG. 5 may be performed by another device or a group of devices separate from or including the web instance hosted by instance engine 301, such as a user device 330, a communication system 340, a device providing a remote database 350, and/or a web host 360. Additionally, or alternatively, one or more process blocks of FIG. 5 may be performed by one or more components of the device 400, such as processor 420, memory 430, input component 440, output component 450, and/or communication component 460.

As shown in FIG. 5, process 500 may include receiving an indication of an event associated with a URL that includes a slug (block 510). For example, the web instance hosted by instance engine 301 (e.g., using processor 420, memory 430, input component 440, and/or communication component 460) may receive an indication of an event associated with a URL that includes a slug, as described above in connection with reference number 110 of FIG. 1A. As an example, the event may include a click event (e.g., caused by a user of a user device clicking or tapping on the URL, or on a UI element associated with the URL, via an input component of the user device). Accordingly, the user device may transmit a request (e.g., an HTTP request) using the URL, and the request may indicate the event.

As further shown in FIG. 5, process 500 may include determining, using an indicator encoded in the slug, that the URL is associated with an action that is included in a concurrency control group (block 520). For example, the web instance hosted by instance engine 301 (e.g., using processor 420 and/or memory 430) may determine, using an indicator encoded in the slug, that the URL is associated with an action that is included in a concurrency control group, as described above in connection with reference number 115 of FIG. 1B. As an example, the indicator may include at least one character in the slug. For example, the indicator may encode an identifier of a concurrency control group out of a plurality of possible concurrency control groups. Additionally, or alternatively, as described in connection with FIG. 2, the indicator may include at least one bit in the slug. For example, the indicator may encode a Boolean or another type of binary indicator of concurrency control. Therefore, the web instance (hosted by instance engine 301) may perform the determination based on the indicator.

As further shown in FIG. 5, process 500 may include communicating with a remote database to determine whether the concurrency control group is locked (block 530). For example, the web instance hosted by instance engine 301 (e.g., using processor 420, memory 430, input component 440, output component 450, and/or communication component 460) may communicate with a remote database to determine whether the concurrency control group is locked, as described above in connection with reference numbers 120 and 125 of FIG. 1B. As an example, the web instance (hosted by instance engine 301) may transmit, and the remote database may receive, a command to perform a write operation (e.g., including a lock key associated with the action and/or the concurrency control group including the action). Accordingly, the remote database may transmit, and the web instance (hosted by instance engine 301) may receive, a status message in response to the command. Therefore, the web instance (hosted by instance engine 301) may determine the action (and/or the concurrency control group including the action) as locked based on the status message indicating that the command failed. On the other hand, the web instance (hosted by instance engine 301) may determine the action (and/or the concurrency control group including the action) as unlocked based on the status message indicating that the command was successful.

As further shown in FIG. 5, process 500 may include selectively triggering execution of the action based on whether the concurrency control group is locked (block 540). For example, the web instance hosted by instance engine 301 (e.g., using processor 420 and/or memory 430) may selectively trigger execution of the action based on whether the concurrency control group is locked, as described above in connection with reference number 145 of FIG. 1D. As an example, the web instance (hosted by instance engine 301) may transmit, and a web host may receive, a request for a configuration file associated with the action. The web host may transmit, and the web instance (hosted by instance engine 301) may receive, the configuration file. Therefore, the web instance (hosted by instance engine 301) may selectively trigger execution of the action, using the configuration file, based on whether the action (and/or the concurrency control group including the action) is locked.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1F and/or FIG. 2. Moreover, while the process 500 has been described in relation to the devices and components of the preceding figures, the process 500 can be performed using alternative, additional, or fewer devices and/or components. Thus, the process 500 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for preventing double actions in a single-click environment, the system comprising:
one or more memories; and
one or more processors, communicatively coupled to the one or more memories, configured to:
receive an indication of a click event associated with a uniform resource locator (URL) that includes a slug;
determine, using a bit included in the slug, that the URL is associated with an action that is controlled for concurrency,
wherein the slug comprises a first portion associated with a session identifier and a second portion associated with an identifier of the action, and
wherein the bit included in the slug is in the second portion;
communicate with a remote database to determine whether the action is currently locked; and
selectively trigger execution of the action based on whether the action is currently locked.

2. The system of claim 1, wherein the bit comprises a most significant bit in a bit sequence that encodes an identifier of the action.

3. The system of claim 1, wherein the one or more processors are configured to:
selectively receive a configuration file, associated with the action, based on whether the action is currently locked,
wherein execution of the action is selectively triggered using the configuration file.

4. The system of claim 1, wherein the one or more processors, to communicate with the remote database, are configured to:
transmit a command, to the remote database, to perform a write operation associated with the action; and
receive a status message, from the remote database, in response to the command,
wherein whether the action is currently locked is determined based on the status message.

5. The system of claim 1, wherein the one or more processors are configured to:
transmit a command, to the remote database, to write a lock key associated with the action,
wherein the lock key is associated with execution of the action.

6. A method of preventing double actions in a single-click environment, comprising:

receiving, at a web instance, an indication of an event associated with a uniform resource locator (URL) that includes a slug;
determining, by the web instance and using an indicator encoded in a bit of the slug, that the URL is associated with an action that is included in a concurrency control group,
wherein the slug comprises a first portion associated with a session identifier and a second portion associated with an identifier of the action, and
wherein the bit included in the slug is in the second portion;
communicating with a remote database to determine whether the concurrency control group is locked; and
selectively triggering, by the web instance, execution of the action based on whether the concurrency control group is locked.

7. The method of claim 6, wherein the event comprises a click event.

8. The method of claim 6, wherein the indicator identifies the concurrency control group from a plurality of possible concurrency control groups.

9. The method of claim 6, wherein the indicator comprises at least one character included in the slug.

10. The method of claim 6, wherein communicating with the remote database comprises:
transmitting a command, to the remote database, to write a lock key associated with the concurrency control group, wherein the lock key includes the indicator encoded in the slug; and
receiving a status message, from the remote database, in response to the command,
wherein whether the concurrency control group is locked is determined based on the status message.

11. The method of claim 6, wherein the web instance comprises an instance in a distributed environment.

12. A non-transitory computer-readable medium storing a set of instructions, the set of instructions comprising:
one or more instructions that, when executed by one or more processors of a device, cause the device to:
receive an indication of an event associated with a uniform resource locator (URL) associated with a slug;
determine, using at least a portion of the slug, that the URL is associated with an action that is controlled for concurrency,
wherein the slug comprises a first portion associated with a session identifier and a second portion associated with an identifier of the action, and
wherein the at least the portion of the slug is in the second portion;
communicate with a remote database to determine whether the action is locked; and
selectively trigger execution of the action based on whether the action is locked.

13. The non-transitory computer-readable medium of claim 12, wherein a most significant bit in a bit sequence encodes an identifier of the action.

14. The non-transitory computer-readable medium of claim 12, wherein the one or more processors further cause the device to:
selectively receive a configuration file, associated with the action, based on whether the action is currently locked,
wherein execution of the action is selectively triggered using the configuration file.

15. The non-transitory computer-readable medium of claim 12, wherein the one or more processors, to communicate with the remote database, cause the device to:
- transmit a command, to the remote database, to perform a write operation associated with the action; and
- receive a status message, from the remote database, in response to the command,
- wherein whether the action is currently locked is determined based on the status message.

16. The non-transitory computer-readable medium of claim 12, wherein the one or more processors further cause the device to:
- transmit a command, to the remote database, to write a lock key associated with the action,
- wherein the lock key is associated with execution of the action.

17. The non-transitory computer-readable medium of claim 12, wherein the event comprises a click event.

18. The non-transitory computer-readable medium of claim 12, wherein the action is included in a concurrency control group.

\* \* \* \* \*